US006760071B1

(12) United States Patent
Chen et al.

(10) Patent No.: US 6,760,071 B1
(45) Date of Patent: Jul. 6, 2004

(54) METHOD OF TRANSFERRING CHARGES FOR A CCD IMAGE-SENSING DEVICE

(75) Inventors: Michael Chen, Hsinchu (TW); Yung-Chuan Wu, Ping-Cheng (TW)

(73) Assignee: Avision Inc., Hsinchu (TW)

( * ) Notice: Subject to any disclaimer, the term of this patent is extended or adjusted under 35 U.S.C. 154(b) by 0 days.

(21) Appl. No.: 09/525,254

(22) Filed: Mar. 14, 2000

(30) Foreign Application Priority Data

Mar. 15, 1999 (TW) ........................................ 88103948 A

(51) Int. Cl.[7] .................................................. H04N 3/14
(52) U.S. Cl. ...................................................... 348/311
(58) Field of Search ................................. 348/322, 311, 348/312, 324, 315, 316; 250/208.1

(56) References Cited

U.S. PATENT DOCUMENTS

| 6,069,658 | A | * | 5/2000 | Watanabe | 348/316 |
| 6,275,261 | B1 | * | 8/2001 | Yamazaki | 348/322 |
| 6,423,959 | B1 | * | 7/2002 | Ikeda et al. | 250/208.1 |
| 6,452,634 | B1 | * | 9/2002 | Ishigami et al. | 348/322 |
| 6,583,818 | B1 | * | 6/2003 | Toma | 348/312 |

* cited by examiner

Primary Examiner—Wendy R. Garber
Assistant Examiner—Rashawn N Tillery
(74) Attorney, Agent, or Firm—Ladas & Parry

(57) ABSTRACT

A method of transferring charges for a CCD image-sensing device. First, the K register elements (every k register elements) are defined as a charge-combining portion, thereby providing m charge-combining portions. The y image-sensing elements sense incident light energy to generate y charge packets proportional to the light intensity. Then, the y charge packets are transferred in a parallel manner to the CCD shift register. The charge packets coupled to each of the m charge-combining portions are accumulated into one specific register element when the k register elements have coupled the charge packets from the image-sensing elements, thereby generating m adding charge packets in the m charge-combining portions. Finally, each of the adding charge packets is serially delivered to the output of the CCD shift register, converting the adding charge packets into proportional voltage levels.

3 Claims, 6 Drawing Sheets

METHOD OF TRANSFERRING CHARGES FOR A CCD IMAGE-SENSING DEVICE

BACKGROUND OF THE INVENTION

1. Field of the Invention

The present invention relates in general to a control method of transferring charges. More specifically, it relates to a method of transferring charges for a CCD (Charge-Coupled Device) image-sensing device.

2. Description of the Related Art

CCD image-sensing devices are widely applied to image processing systems and digital signal processing systems, because they can serve as shift registers or sequential memory devices with high density. For example, CCD image-sensing devices are applied in scanners, digital cameras, copy machines, etc.

For conventional scanners or contact image scanners (CIS), their image processing portions comprise CCD image-sensing devices. FIG. 1 shows a schematic structure of a CCD image-sensing device. In general, a CCD image-sensing device at least comprises: a row of image-sensing elements (P1~Pn) for sensing the light energy falling thereon and generating charge packets proportional to the light intensity; a CCD analog shift register with plural register elements ($SH_1$~$SH_{2n}$) for receiving and storing the charge packets in parallel; and an output amplifier (OP) for converting each of the charge packets into proportional voltage level (Vim). The CCD shift register is controlled by two clock signals $\phi_1$ and $\phi_2$, shifting the charge packets stored in the register elements serially to the output amplifier (OP).

FIGS. 2(a) to 2(f) show the charge transferring process in the CCD shift register depicted in FIG. 1, and the waveforms of the clock signals $\phi_1$ and $\phi_2$. The structure of the CCD shift register is schematically depicted in FIG. 2(a). For brevity, only 5 gate electrodes (E1~E5) in the CCD shift register are shown, and the threshold voltage is 0. The 5 gate electrodes E1~E5 and the p-type semiconductor substrate (hereinafter referred to as p-type substrate) $P_{sub}$ form 5 register elements.

At time $t_1$, $\phi_1$ and $\phi_2$ are at voltage levels 0 and V. The distribution of potential barriers in the p-type substrate $P_{sub}$ is depicted as FIG. 2(b). The potential barriers beneath the gate electrodes E1, E3, and E5 are higher than those beneath the gate electrodes E2 and E4. Hence, the charge packets (depicted as dash lines) will be stored in the regions beneath the gate electrodes E2 and E4, in the p-type substrate $P_{sub}$.

At time $t_2$, both $\phi_1$ and $\phi_2$ are at voltage levels V/2, and the distribution of potential barriers in the p-type substrate $P_{sub}$ is depicted as FIG. 2(c). The arrows depicted in FIG. 2(c) mean when the time changes form $t_2$ to $t_3$ the potential barriers beneath odd electrodes will decrease and those beneath even electrodes will increase.

At time $t_3$, $\phi_1$ and $\phi_2$ are at voltage levels 3V/4 and V/4, and the distribution of potential barriers in the p-type substrate $P_{sub}$ is depicted as FIG. 2(d). Therefore, the charge packets stored beneath the gate electrodes E2 and E4 are transferred to the regions beneath the gate electrodes E3 and E5 with lower potential barriers.

Finally at time $t_4$, $\phi_1$ and $\phi_2$ are at voltage levels V and 0, and the distribution of potential barriers in the p-type substrate $P_{sub}$ is depicted as FIG. 2(e).

During the period from $t_1$ to $t_4$, the charge packets are transferred toward right side for an electrode. Similarly, during the periods from $t_5$ to $t_6$ and $t_7$ to $t_8$, the charge packets are also transferred toward right side for an electrode.

The resolution of scanners generally is 600 dpi (dot/inch) or more, however, the resolution of 300 dpi is accurate enough for scanners to scan figures of texts and documents. For a scanner of 600 dpi resolution, the images in every inch of the scanned object are converted into 600 charge packets stored in a CCD shift register. Then, the 600 charge packets are shifted serially to the output amplifier for processing. However, even if the demanded resolution for processing is 300 dpi, the 600 charge packets still must be transferred out one by one. Consequently, the total processing speed is reduced.

For the scanner of 600 dpi resolution, if every two or more adjacent charge packets stored in the CCD shift register can be combined by adjusting the potential barrier distribution depicted in FIGS. 2(a)~2(e), then only 300 or less adding (combined) charge packets stored in the CCD shift register must be transferred out to reconstruct the image of 300 dpi resolution, thereby improving the charge-transferring speed.

SUMMARY OF THE INVENTION

Therefore, an object of the present invention is to provide a method of transferring charge for a scanner.

The present invention achieves the above-indicated objects by providing a method of transferring charge for a CCD image-sensing device, the CCD image-sensing device at least having plural (y) image-sensing elements and a CCD shift register with plural (n=2y) register elements, each of the image-sensing elements operating in conjunction with two of the register elements, the method comprising the following steps.

Defining a specific number of the register elements (every k register elements) as a charge-combining portion, thereby providing plural (m) charge-combining portions.

Make the y image-sensing elements sense light energy falling thereon to generate y charge packets proportional to the light intensity.

Transfer the y charge packets in parallel to the CCD shift register; wherein the charge packets coupled to each of the m charge-combining portions is accumulated into one specific register element in each of the m charge-combining portions when the k register elements in each of the m charge-combining portions have coupled the charge packets from the image-sensing elements, thereby generating m adding charge packets in the m charge-combining portions.

Deliver each of the adding charge packets serially to the output of the CCD shift register and converting the adding charge packets into proportional voltage levels.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
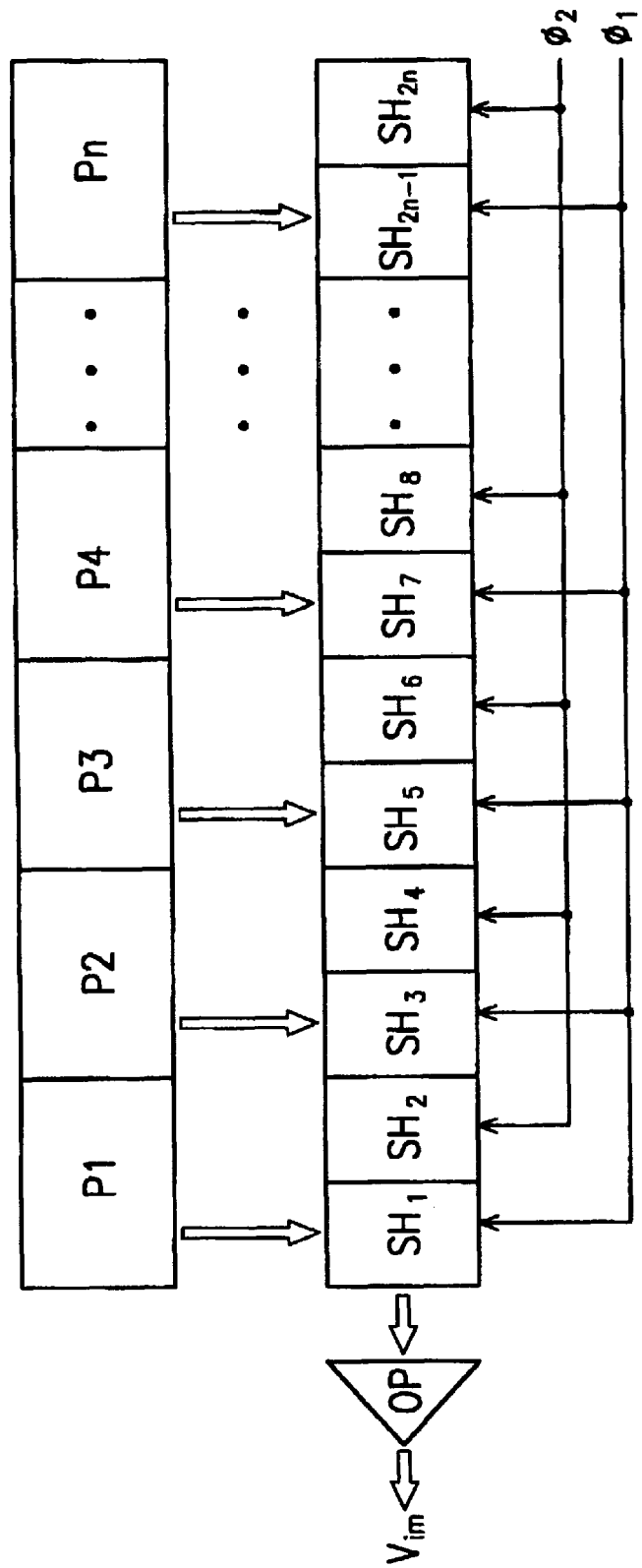
FIG. 1 shows a schematic structure of a CCD image-sensing device.
Figure 2:
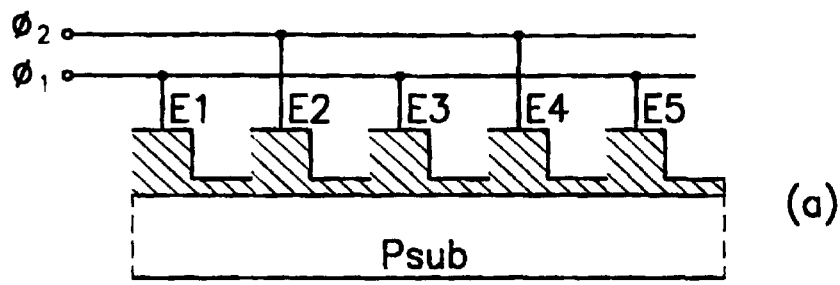
FIGS. 2(a) to 2(f) show the charge transferring process in the CCD shift register depicted in FIG. 1, and the waveforms of the clock signals $\phi_1$ and $\phi_2$.
Figure 2:
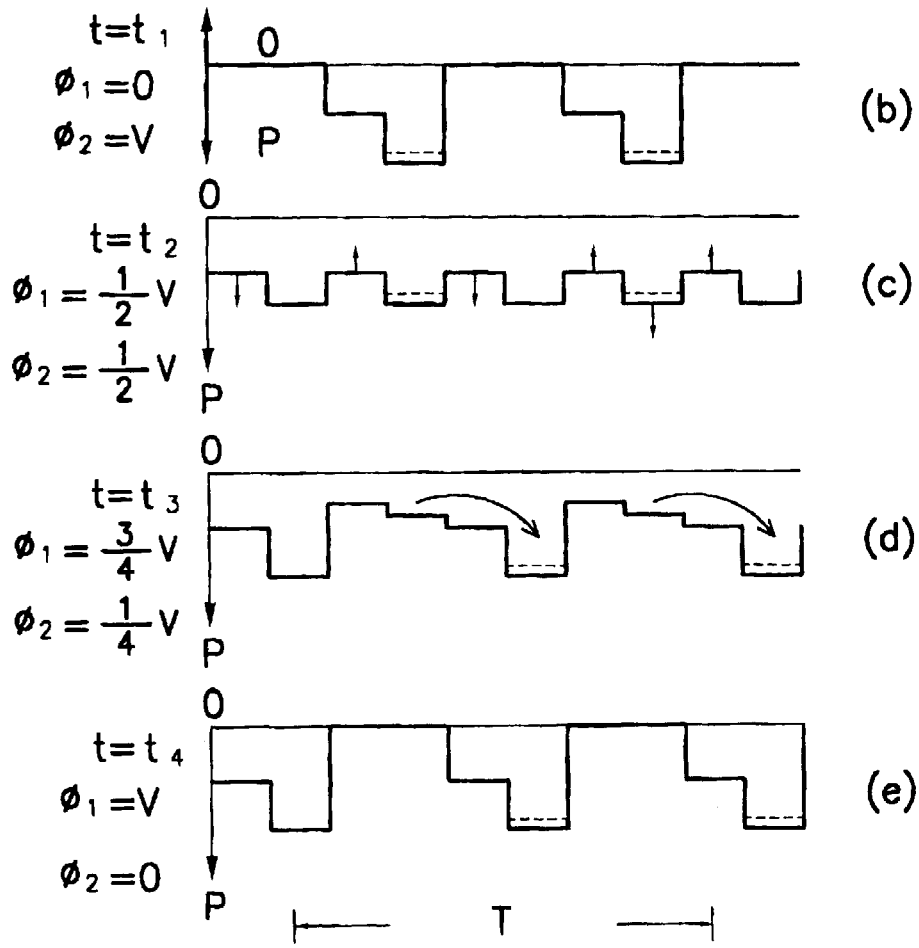
Figure 2:
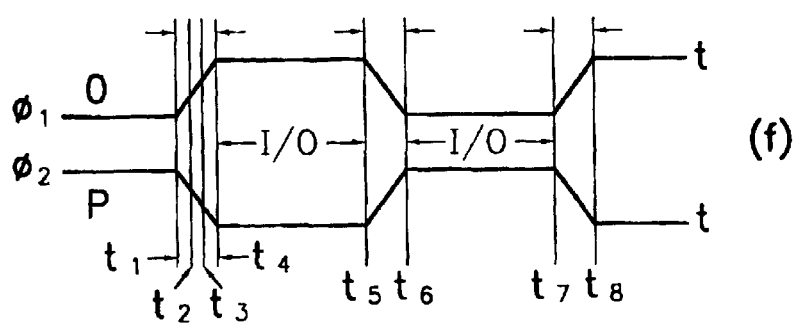

The first embodiment of the present invention will be described hereinafter in detail with reference to FIGS. 3(a) to 3(f) and FIG. 4. The schematic structure of a CCD image-sensing device in this embodiment is similar with what is depicted in FIG. 1, except of the control signals.

Figure 3:
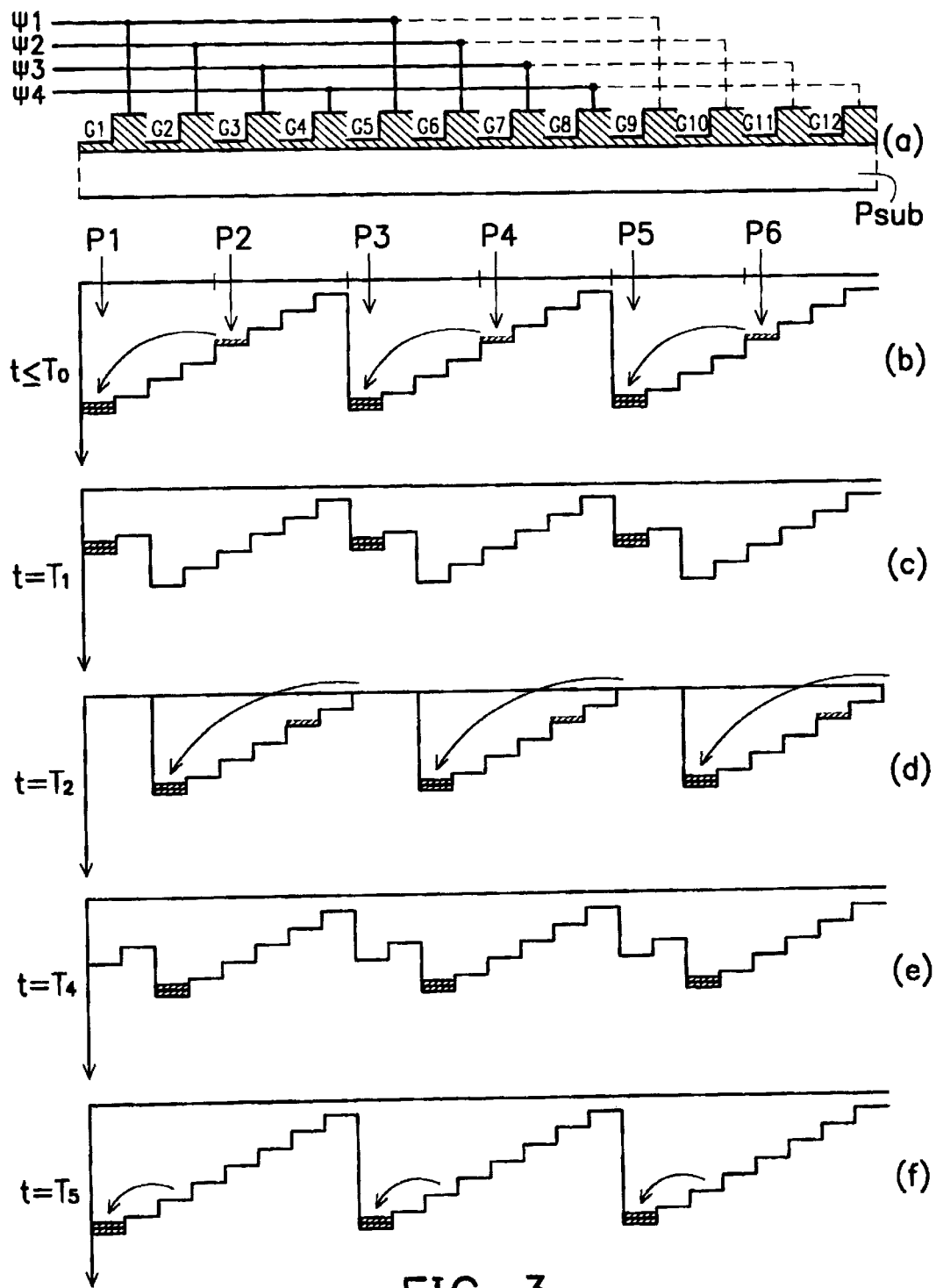
FIGS. 3(a) to 3(f) show the charge transferring process in the CCD shift register according to the first embodiment of the present invention.

The structure of the CCD shift register is schematically depicted in FIG. 3(a). For brevity, only 12 gate electrodes (G1~G12) in the CCD shift register are shown. The 12 gate electrodes G1~G12 and the p-type substrate $P_{sub}$ form 12 (n=12) register elements (hereinafter G1~G12 are referred to as register elements). First, define the register elements (G1~G12) into 3 (m=3) charge-combining portions, therefore each of the charge-combining portion has 4 (k=4) register elements. The first charge-combining portion comprises the register elements G1~G4; the second charge-combining portion comprises the register elements G5~G8; the third charge-combining portion comprises the register elements G9~G12.

The register elements G1, G5, and G9 are assigned as the first specific register elements corresponding to the first, second and third charge-combining portions. The register elements G2, G6, and G10 are assigned as the second specific register elements corresponding to the first, second and third charge-combining portions.

In addition, four control signals ($\psi_1$ to $\psi_4$) are respectively provided to each of the register elements in the charge-combining portions. The first control signal $\psi_1$ is provided to the first specific register elements G1, G5, and G9; the second control signal $\psi_2$ is provided to the register elements G2, G6, and G10; the third control signal $\psi_3$ is provided to the register elements G3, G7, and G11; and the fourth control signal $\psi_4$ is provided to the register elements G4, G8, and G12.

Figure 4:
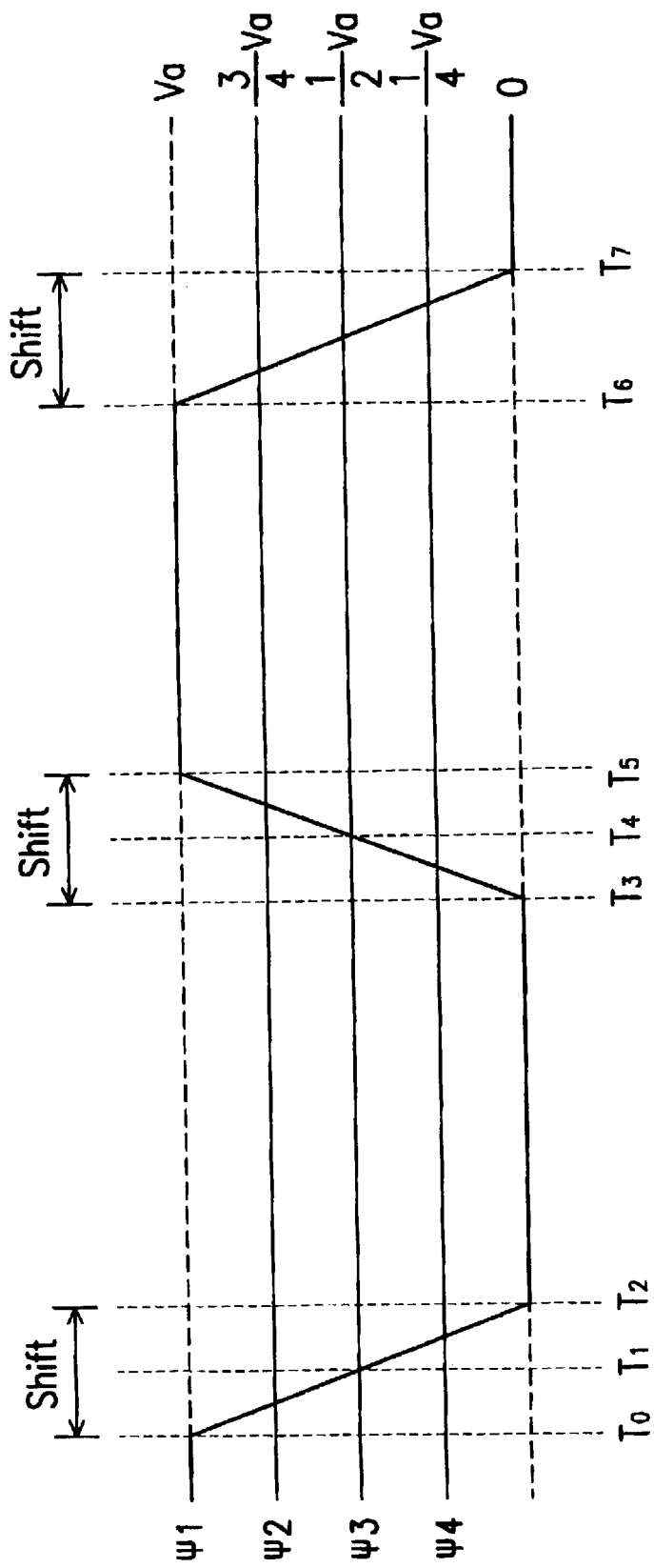
FIG. 4 shows the waveforms of the control signals $\psi_1$ to $\psi_4$ according to the first embodiment of the present invention.

FIG. 4 shows the waveforms of the control signals $\psi_1$ to $\psi_4$. The first control signal $\psi_1$ is a clock signal with a voltage swing between a voltage level of 0 and a specific voltage level of $V_a$. The second to fourth control signals $\psi_2 \sim \psi_4$ have a constant voltage level of $3V_a/4$, $V_a/2$, and $V_a/4$ respectively.

Assume that the threshold voltage of the register elements is 0, and the charge packets are transferred along the direction from the register element G12 to the register element G1.

Before time $T_0$, $\psi_1=V_a$, $\psi_2=3V_a/4$, $\psi_3=V_a/2$, and $\psi_2=V_a/4$ are provided to bias the register elements G1~G12, and the distribution (or profile) of potential barriers in the p-type substrate $P_{sub}$ is depicted as FIG. 3(b).

Input and Combination of the Charge Packets

Before time $T_0$, let the image-sensing elements (in this embodiment: they are $P_1 \sim P_6$) of a CCD image-sensing device sense the light energy falling thereon to generate six charge packets proportional to the light intensity.

Then, the six charge packets are transferred in parallel to the CCD shift register of the CCD image-sensing device. The charge packets (depicted as dash lines) should be stored in the register elements $G_1$, $G_3$, $G_5$, $G_7$, $G_9$, $G_{11}$, i.e. the regions beneath the gate electrodes $G_1$, $G_3$, $G_5$, $G_7$, $G_9$, $G_{11}$ in the p-type substrate $P_{sub}$. However, the charge packets in the register elements $G_3$, $G_7$, $G_{11}$ immediately moves to the register elements $G_1$, $G_5$, $G_9$ respectively, because the distribution of potential barriers in the p-type beneath the electrodes $G_1 \sim G_4$, $G_5 \sim G_8$, $G_9 \sim G_{12}$ present stair-like profiles due to the bias of the first to fourth control signals $\psi_1 \sim \psi_4$. Therefore, the charge packets stored in the register elements $G_3$, $G_7$, $G_{11}$ will move to the register elements $G_1$, $G_5$, $G_9$ and are combined with the charge packets stored in the register elements G1, G5, G9 respectively. There are three charge packets stored in the register elements G1, G5, G9, as shown in FIG. 3(b).

Charge Transferring

During the period between time $T_0$ and $T_2$, the CCD shift register carried out charge transferring process.

At time $T_1$, $\psi_2 \sim \psi_4$ keep constant ($\psi_2=3V_a/4$, $\psi_3=V_a/2$, and $\psi_2=V_a/4$), and $\psi_1$ decreases to $V_a/2$. The distributions of potential barriers in the p-type substrate beneath the electrodes G2~G4, G6~G8, G10~G12 still are downward stair-like, and the potential barriers beneath the electrodes G1, G5, and G9 increase, as depicted in FIG. 3(c).

At time $T_2$, $\psi_2 \sim \psi_4$ keep constant ($\psi_2=3V_a/4$, $\psi_3=V_a/2$, and $\psi_2=V_a/4$), and $\psi_1$ decreases to 0. The distributions of potential barriers in the p-type substrate beneath the electrodes G2~G4, G6~G8, G10~G12 still are downward stair-like, and the potential barriers beneath the electrodes G1, G5, and G9 all increase to the level higher than those beneath the other electrodes, as depicted in FIG. 3(d). The three charge packets stored in the register elements G1, G5, G9 will move toward the low potential position. Therefore, the charge packets stored in the register elements G5, G9 (and G13 which is not shown in FIG. 3(d)) are transferred to the second specific register elements G2, G6, and G10 respectively, and the charge packet stored in the register elements G1 is moved out of the CCD shift register.

During the period between time $T_3$ and $T_5$, the CCD shift register carried out charge transferring process.

At time $T_4$, $\psi_2 \sim \psi_4$ keep constant ($\psi_2=3V_a/4$, $\psi_3=V_a/2$, and $\psi_2=V_a/4$), and $\psi_1$ increases from 0 to $V_a/2$. The distributions of potential barriers in the p-type substrate beneath the electrodes G2~G4, G6~G8, G10~G12 still are downward stair-like, and the potential barriers beneath the electrodes G1, G5, and G9 decrease, as depicted in FIG. 3(e).

At time $T_5$, $\psi_2 \sim \psi_4$ keep constant ($\psi_2=3V_a/4$, $\psi_3=V_a/2$, and $\psi_2=V_a/4$), and $\psi_1$ increases to $V_a$. The distributions of potential barriers in the p-type substrate beneath the electrodes G2~G4, G6~G8, G10~G12 still are downward stair-like, and the potential barriers beneath the electrodes G1, G5, and G9 further decrease to the level lower than those beneath the other electrodes (such as G2, G6, G10) as depicted in FIG. 3(f). Now, the three charge packets stored in the second specific register elements G2, G6, G10 will move to the first specific register elements of lower potential barriers (i.e., G1, G5, and G9). Therefore, the charge packets stored in the second specific register elements G2, G6, G10 (in FIG. 3(e)) are transferred to the first specific register elements G1, G5, G9 respectively, as shown in FIG. 3(f).

Similarly, during the period between time $T_6$ and $T_7$, the CCD shift register carried out charge transferring process. The charge transferring process between the time $T_6$ and $T_7$ is the same as that between the time $T_0$ and $T_2$.

All charge packets stored in the CCD shift register can be serially shifted out by repeating the operations during the time periods $T_0 \sim T_2$ and $T_3 \sim T_5$.

From above descriptions, it is quite clear that every two charge packets sensed by every two image-sensing elements are combined into an adding charge packets in each of the charge-combining portions by adjusting the distribution of potential barrier of the register elements in each of the charge-combining portions. Then, each of the adding charge packets is shifted out of the CCD shift register serially.

Using the method of transferring charges according to the present invention obtains the following advantages:

(1) Each of the adding charge packets is formed by combine two charge packets sensed by two adjacent image-sensing elements. Therefore, the exposure time required to sense images for the image-sensing elements in a CCD image-sensing device can be reduced in half. In the first embodiment, after the charge packets sensed by the image-sensing elements P1 and P2 are inputted to the register elements G1 and G3, the two charge packets are combined into an adding charge packet and stored in the register element G1, and thus exposure time of the image-sensing elements P1 and P2 can be reduced in half.

(2) In the conventional art, the shift of each of the charge packets is only moved with a shift of a register element. According to the present invention, the shift of each of the adding charge packets is moved with an average shift more than two register element. The speed for shifting out the adding charge packets speeds up, therefore the processing speed of the CCD image-sensing device is improved.

(3) By appropriate providing and switching the control signals used to bias the register elements, a novel CCD register which can carries charge transferring process in conventional way or in the way of the present invention, depending on the choice of the resolution required by users.

In the first embodiment, every two charge packets sensed by every two adjacent image-sensing elements are combined into an adding charge packet and then shifted in aerial. Therefore, the CCD image-sensing device with the resolution of 600 dpi will output the adding charge packets in the resolution of 300 dpi. However, the present invention is not limited to only be able to combine every two charge packets into an adding charge packet. Any number of charge packets can be combined into an adding charge packet by providing appropriate control signals for bias register elements, and then each of the adding charge packets is shifted out of the CCD shift register serially.

FIGS. 5(a) to 5(d) show the charge transferring process in the CCD shift register according to the second embodiment of the present invention. FIG. 6 shows the waveforms of the control signals $\Phi_1$ to $\Phi_6$ according to the second embodiment of the present invention. In the second embodiment, every three (x=3) charge packets sensed by every three (x=3) adjacent image-sensing elements are combined into an adding charge packet and then shifted in aerial. Each of the charge-combining portion has six register elements.

In FIG. 6, the first control signal $\Phi_1$ is a clock signal with a voltage swing between a voltage level of 0 and a specific voltage level of $V_b$. The second to sixth control signals $\Phi_2$~$\Phi_6$ have a constant voltage level of $5V_b/6$, $4V_a/6$, $V_a/2$, $2V_a/6$, and $V_a/6$ respectively.

If x charge packets sensed by x image-sensing elements are combined into an adding charge packets in a charge-combining portion comprising k (2x=6) register elements, the first control signal of the k control signals is a clock signal with a voltage swing between a voltage level of 0 and a specific voltage level of $V_b$, and the j-th control signal of the k control signals has a constant voltage level of $$\left(\frac{k+1-j}{k}V_a\right),$$

where $2 \leq j \leq k$.

Figure 5:
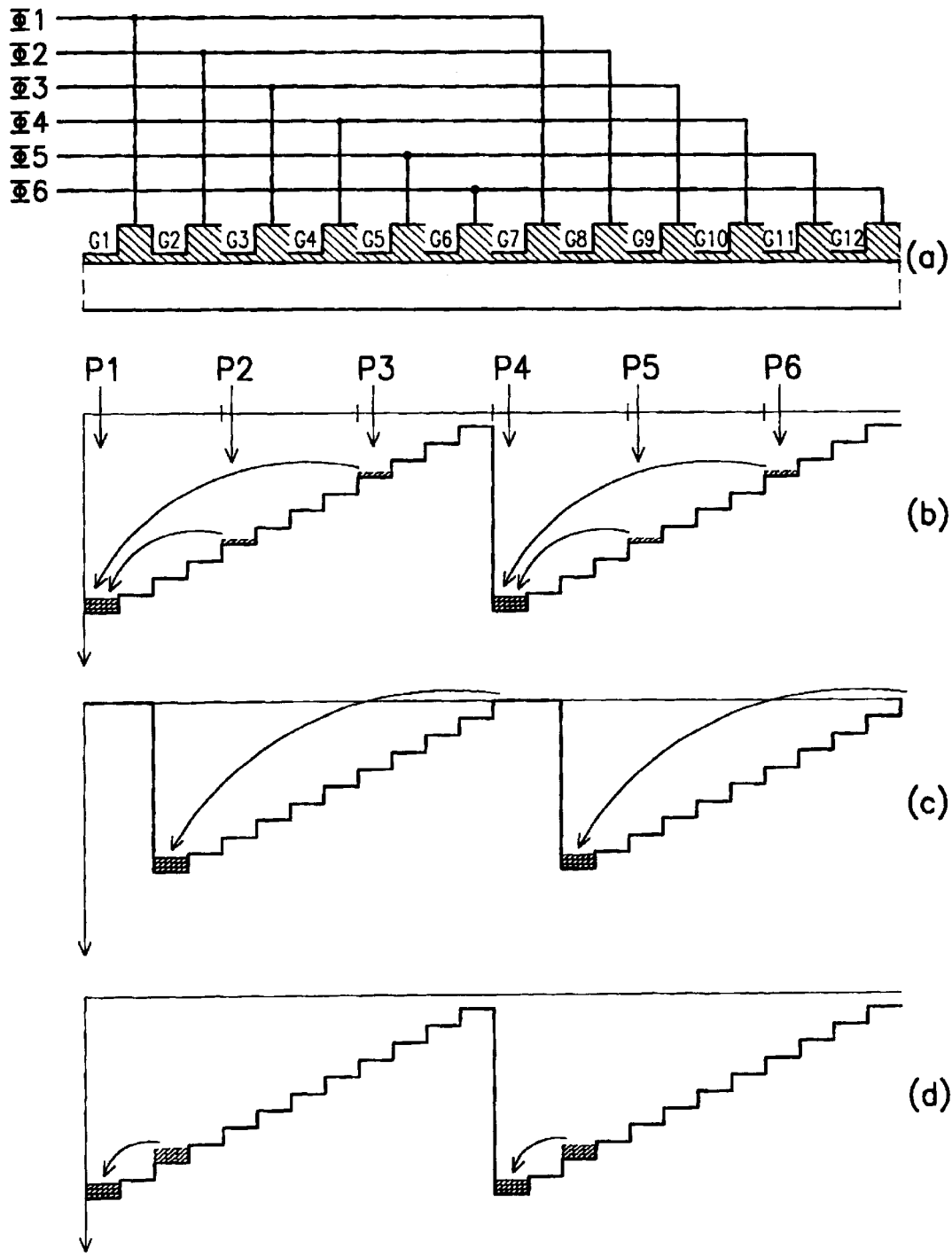
FIGS. 5(a) to 5(d) show the charge transferring process in the CCD shift register according to the second embodiment of the present invention.
Figure 6:
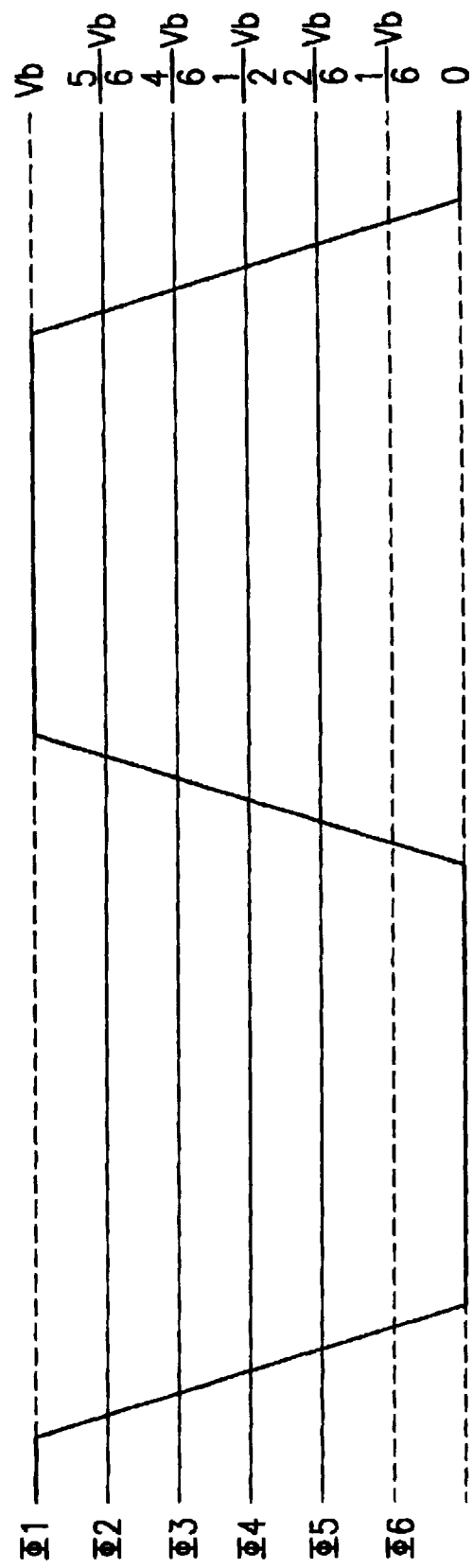
FIG. 6 shows the waveforms of the control signals $\Phi_1$ to $\Phi_6$ according to the second embodiment of the present invention.

Referring to FIGS. 5(a)~5(d), the charge packets sensed by the image-sensing elements P1~P6 are inputted in parallel to the CCD shift register. Due to the bias of the control signals $\Phi_1$~$\Phi_6$, the distributions of the potential barriers beneath the register elements G1~G6 and G7~G12 are downward stair-like. Therefore, the charge packets in the register elements G3 and G5 move to the register elements G3 and combines with the charge packet in the register element G1 to form an adding charge packet. The charge packets in the register elements G9 and G11 move to the register elements G7 and combines with the charge packet in the register element G7 to form an adding charge packet. Two adding charge packets are stored in the register elements G1 and G7, as depicted in FIG. 5(b).

Then the two adding charge packets are shifted out of the CCD shift register. The transferring process is depicted in FIGS. 5(c) and 5(d), and it is similar with the process described in the first embodiment.

While the invention has been described by way of examples and in terms of the preferred embodiments, it is to be understood that the invention is not limited to the disclosed embodiments. For example, the control signals used to bias the register elements can have different waveforms with what the two embodiments is proposed. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of transferring charges for a CCD image-sensing device, the CCD image-sensing device at least having plural (y) image-sensing elements and a CCD shift register with plural (n=2y) register elements, each of the image-sensing elements operating in conjunction with two of the register elements, the method comprising the following steps:

defining a specific number of the register elements (every k register elements) as a charge-combining portion, thereby providing plural (m) charge-combining portions;

making the y image-sensing elements sense light energy falling thereon to generate y charge packets proportional to the light intensity;

providing k control signals to respectively adjust the potential barriers of the k register elements in each of the m charge-combining portions, whereby the distribution of the potential barriers of the k register elements in each of the m charge-combining portions forms a stair-like falling profile such that the charge packets coupled to each of the m charge-combining portions are accumulated and form the adding charge packet in the first specific register element of each of the m charge-combining portions; wherein the first control signal of the k control signals is a clock signal with a voltage swing between a voltage level of 0 and a specific voltage level of $V_a$, and the j-th control signal of the k control signals has a constant voltage level of $$\left(\frac{k+1-j}{k}V_a\right),$$

where $2 \leq j \leq k$;

in parallel transferring the y charge packets to the CCD shift register; wherein the charge packets coupled to each of the m charge-combining portions are accumulated into a first specific register element in each of the m charge-combining portions when the k register elements in each of the m charge-combining portions have coupled the charge packets from the image-sensing elements, thereby generating m adding charge packets in the m charge-combining portions; and delivering each of the adding charge packets serially to the output of the CCD shift register and converting the adding charge packets into proportional voltage levels.

2. The method as claimed in claim 1, wherein in each of the m charge-combining portions, the register element provided the most closest to the output of the CCD shift register is assigned as the first specific register element for storing one of the m adding charge packets, and the potential barrier in the first specific register element is controlled by the first control signal; the other (k−1) register elements in each of the m charge-combining portions are controlled by the second to k-th control signals respectively in accordance with the closeness to the output of the CCD shift register.

3. The method as claimed in claim 2, wherein when the voltage level of the first control signal changes from the specific voltage level of $V_a$ to 0, the adding charge packets in the first specific register element of each of the charge-combining portion move to a second specific register element of the other charge-combining portion; when the voltage level of the first control signal changes from the specific voltage level of 0 to $V_a$, the adding charge packets in the second register elements of each of the charge-combining portion move the first specific register element of the same charge-combining portion.

* * * * *